April 30, 1957 — R. P. SCHERER — 2,790,548
ARTICLE FEEDING HOPPERS
Filed March 15, 1952 — 6 Sheets-Sheet 1
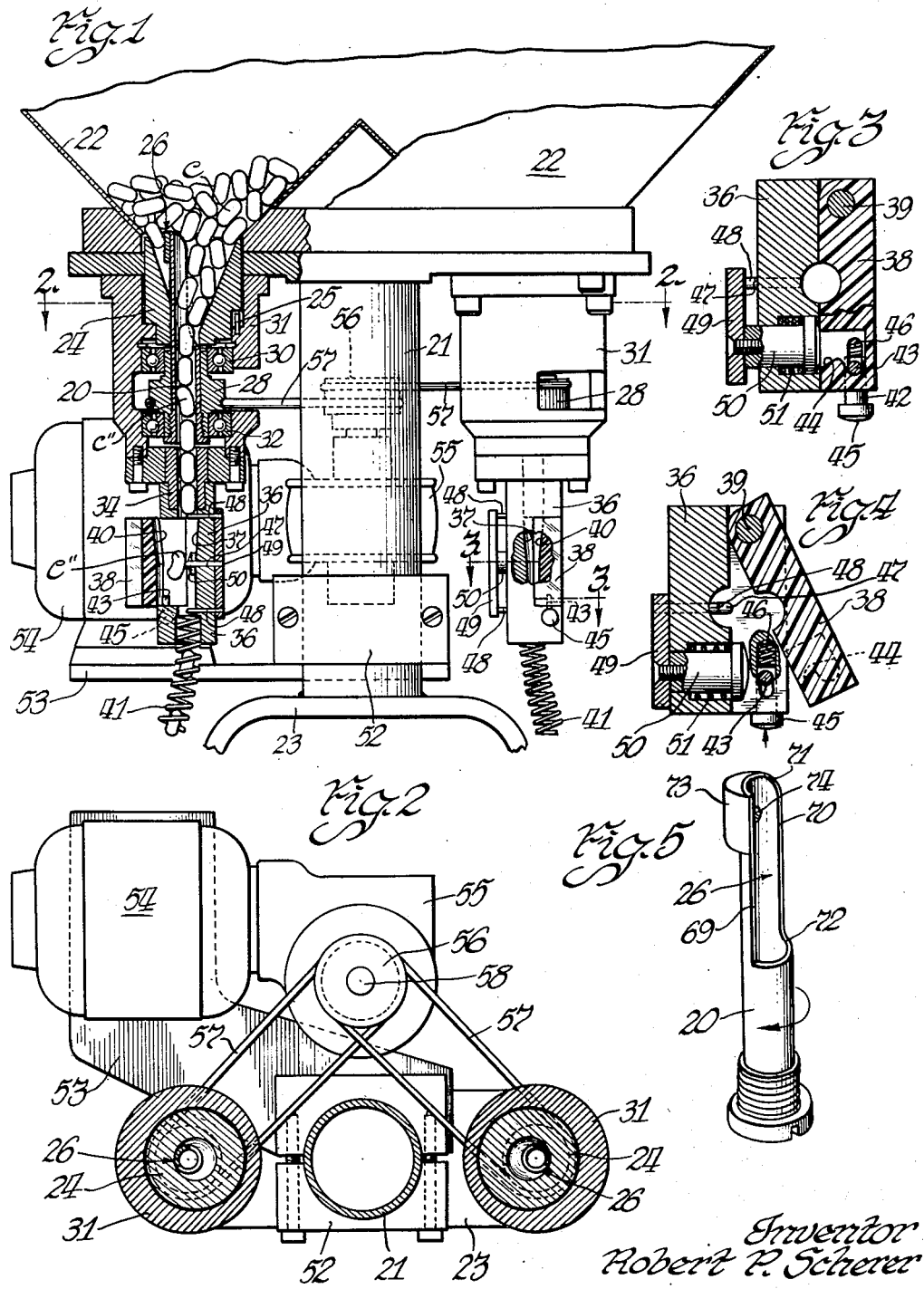

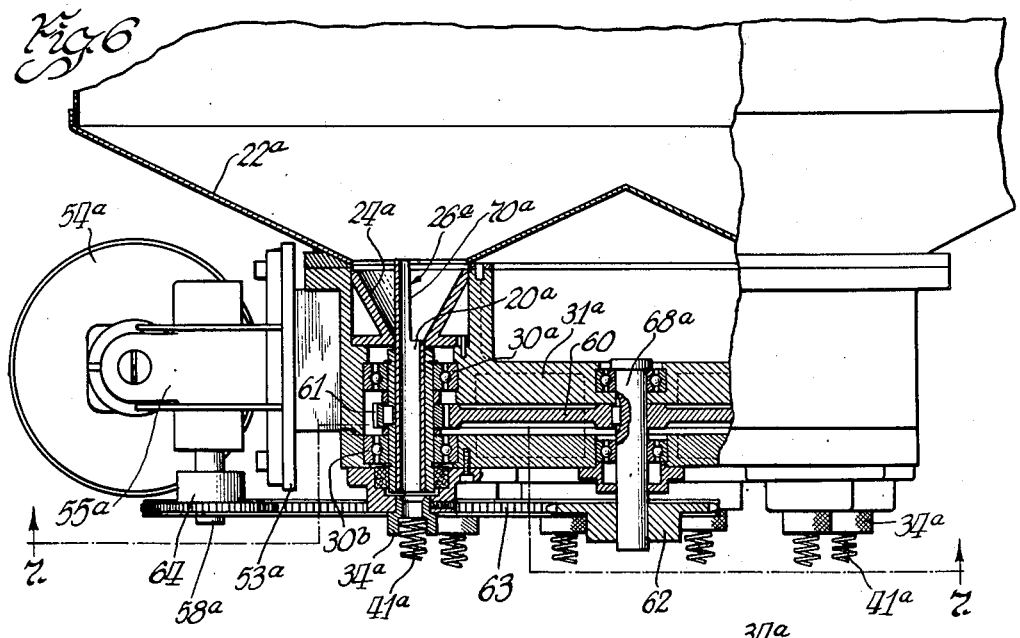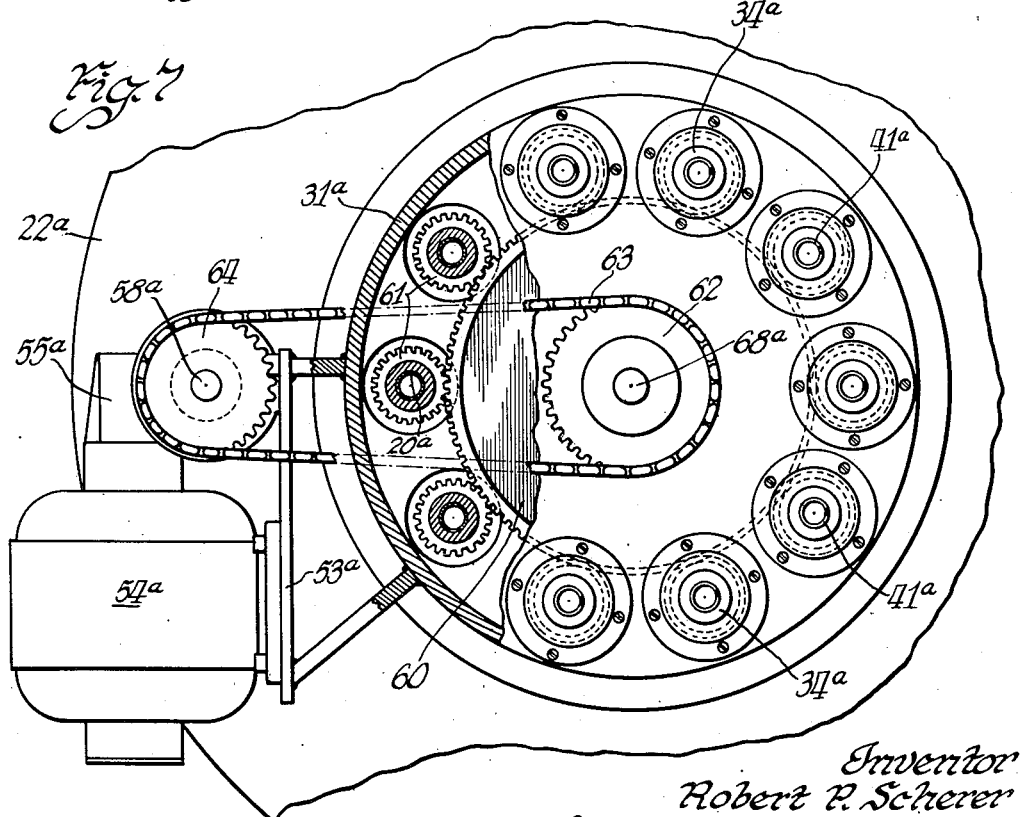

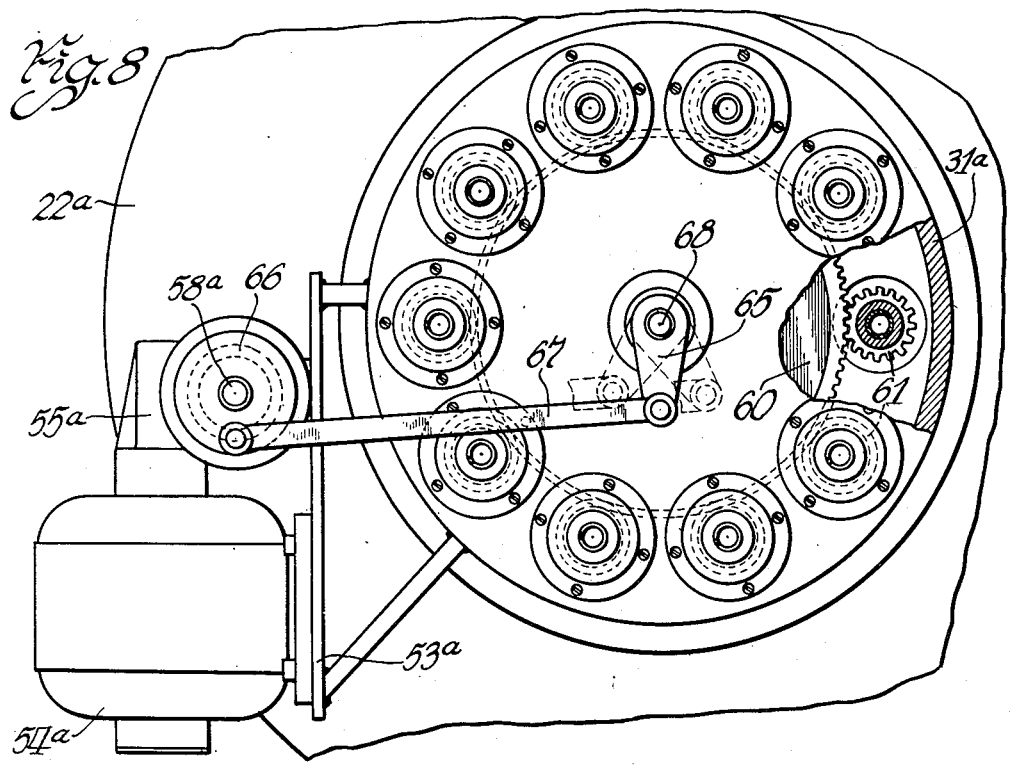
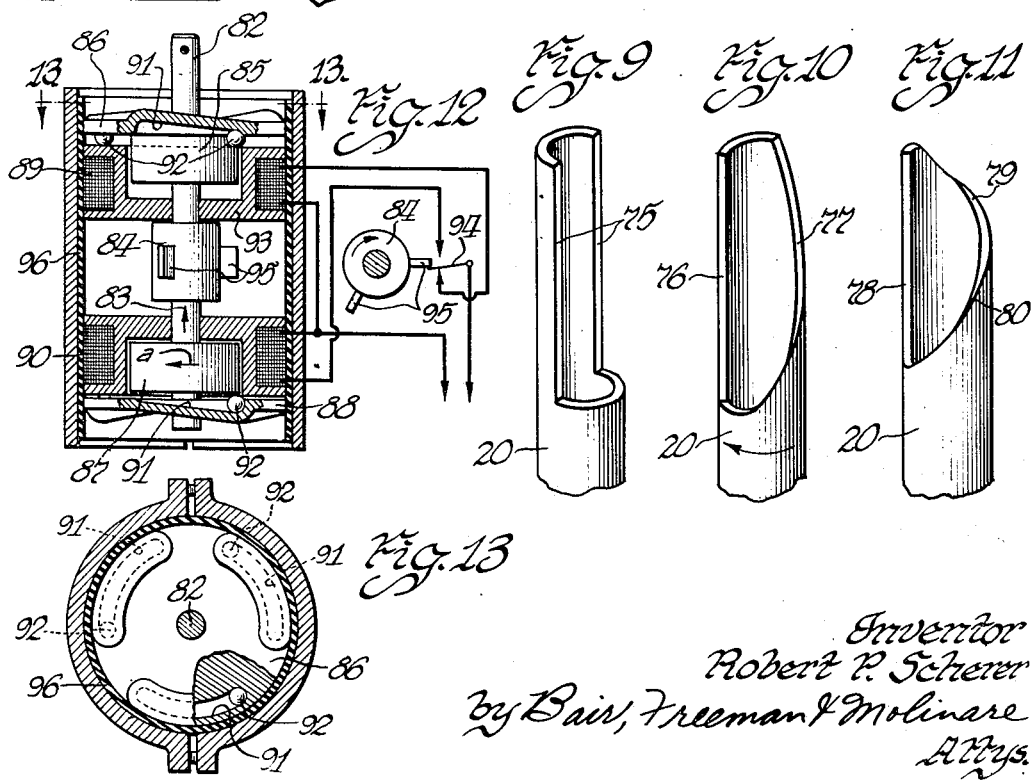

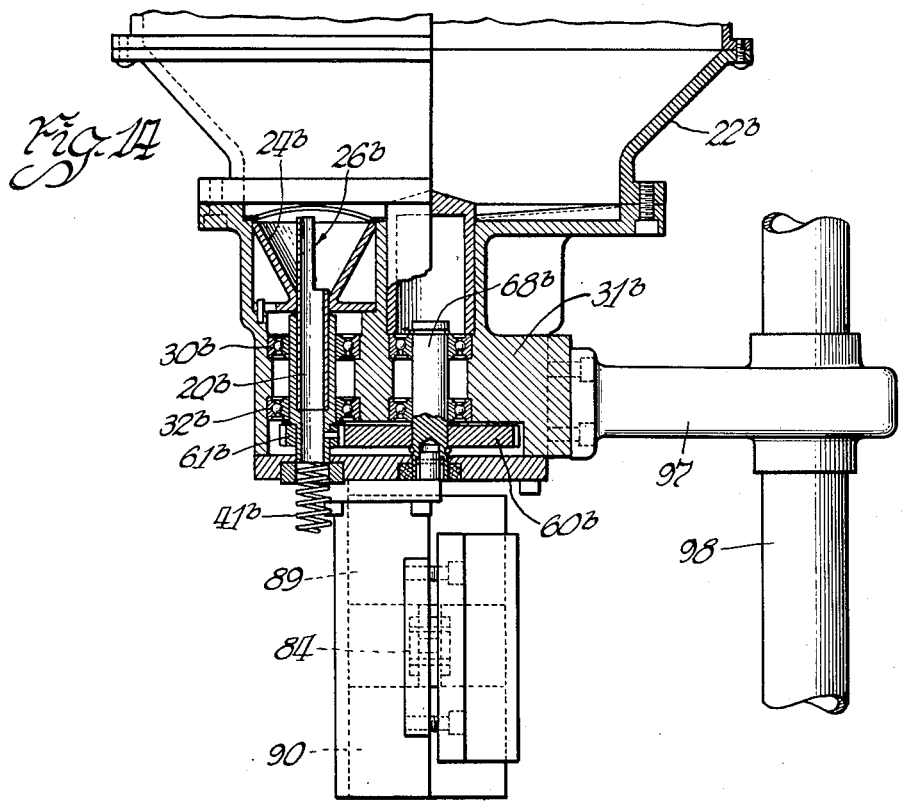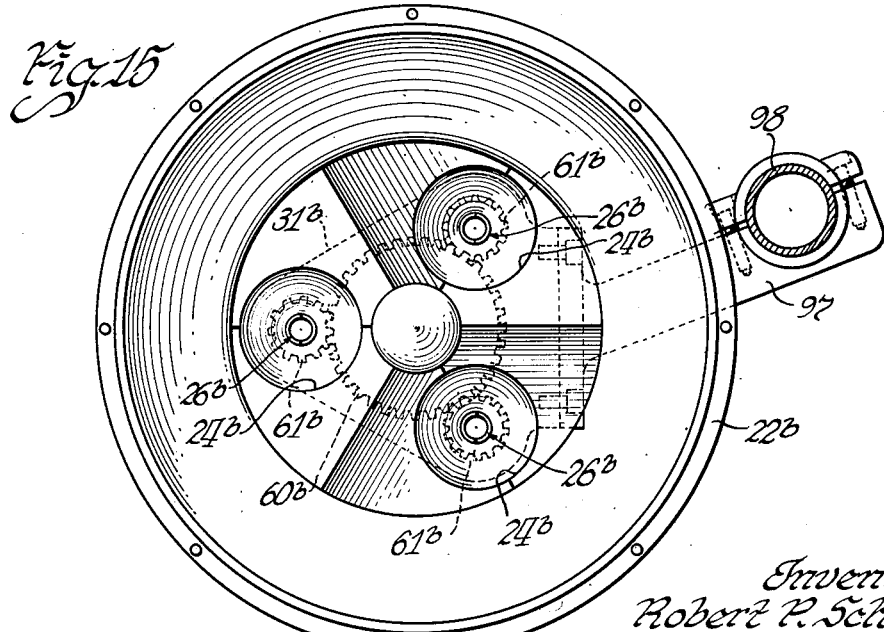

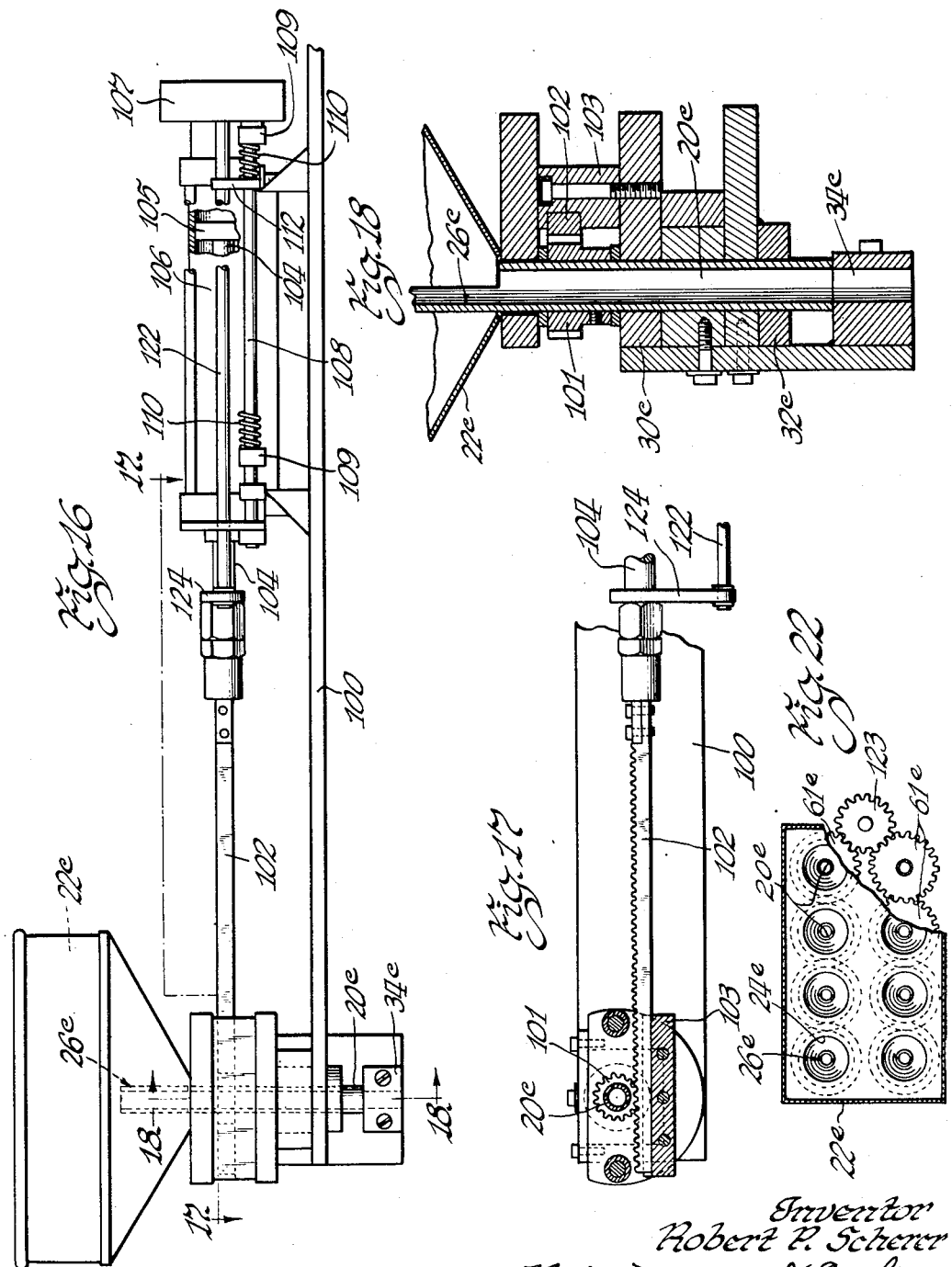

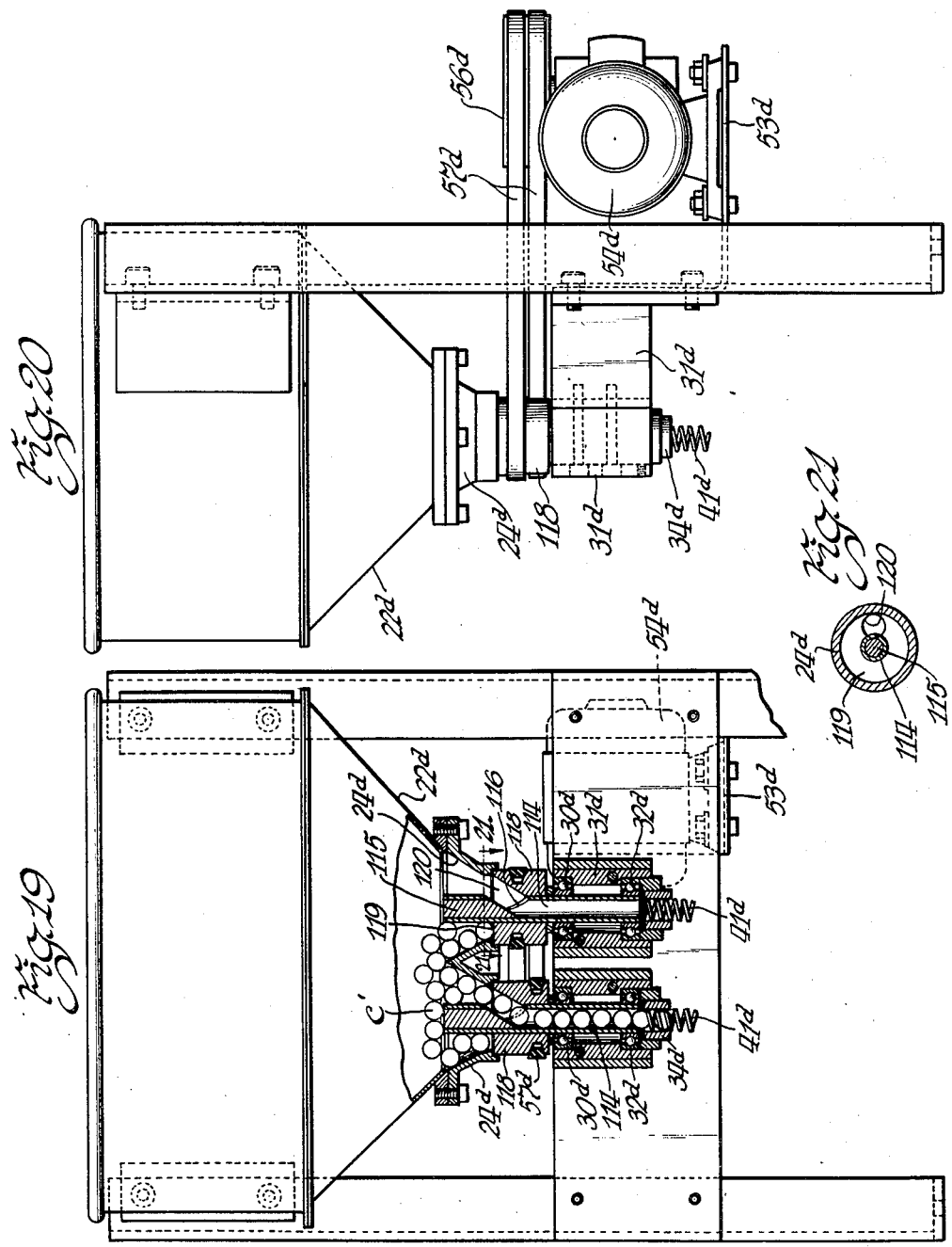

United States Patent Office 2,790,548
Patented Apr. 30, 1957

2,790,548

ARTICLE FEEDING HOPPERS

Robert Pauli Scherer, Detroit, Mich., assignor to R. P. Scherer Corporation, Detroit, Mich., a corporation of Michigan Application March 15, 1952, Serial No. 276,866

10 Claims. (Cl. 209—71)

This invention relates to article feeding hoppers, the present application being a continuation-in-part of my copending application, Serial No. 151,904, filed March 25, 1950, now Patent No. 2,623,494. The article feeding hoppers disclosed herein have means for automatically feeding a mass of articles such as capsules of medicament or the like from the hoppers wherein they are deposited into delivery tubes so that the tubes can deliver them to mechanisms for performing subsequent operations thereon, such as banding or encircling operations as disclosed in my parent application, without the necessity of manually handling the capsules.

One object of the present invention is to provide hoppers with means for orienting and feeding elongated capsules properly into delivery tubes, the arrangements including feed tubes having feed scoop arrangements for agitating and orienting the capsules so that the capsules will enter lengthwise into the feed tubes, modified feed scoop arrangements being provided for spherical capsules.

Another object is to provide feed scoops which are either rotatably or oscillatably mounted and to provide a variety of mechanisms for performing the rotation or oscillation thereof.

Still another object is to provide a rotary or oscillating feed tube having a mutilated portion to serve as a feed scoop, one form of the invention comprising the upper end of the feed tube being half cut away so that the remaining portion forms the feed scoop, said remaining portion rotating or oscillating off-center to serve also as an agitator for the articles.

A further object is to provide a variety of means for imparting rotation to the feed scoops, either continuously in one direction or alternately in opposite directions.

Still a further object is to provide a means for increasing scooping and agitating actions if required.

Still a further object is to provide a selector in the outlet from the feed tube to stop a capsule of undesirable shape such as a "banana" capsule, the selector being openable for ejecting the undesired capsule and having means to automatically hold the rest of the capsules above it against feeding movements until the selector is reclosed.

An additional object is to provide various formations of the feed scoop adaptable for different sizes and proportions of capsules and for different degrees of agitation of the capsules in the hopper as required because of the specific character thereof.

Another additional object is to provide a feed tube arrangement designed specifically for spherical capsules in which the feed tube has a side entrance hole and an angular passageway from the top of a rotating or oscillating surface leading to this opening, the rotating or oscillating surface constituting the bottom of a hopper in which a mass of the capsules are deposited.

With these and other objects in view, my invention consists in the construction, arrangement and combination of the various parts of my article feeding hoppers, whereby the objects contemplated are attained as hereinafter more fully set forth, pointed out in my claims and illustrated in the accompanying drawings, wherein:

Figure 1 is a side elevation partly in vertical section of an article feeding hopper showing a dual-hopper form of my present invention.

Figure 2 is a detail horizontal sectional view thereof on the line 2—2 of Figure 1, particularly to show the drive for the feed tubes.

Figure 3 is an enlarged sectional view on the line 3—3 of Figure 1 and illustrates a selector of the hopper in its normal operating position.

Figure 4 is a similar sectional view showing the door of the selector released for ejecting an undesirable capsule from the selector.

Figure 5 is a perspective view of a combined feed tube and feed scoop forming an important element of my present invention.

Figure 6 is a vertical sectional view through a modified form of my invention showing a multiple unit arrangement, with the units in a circle and a chain and gear drive for the plurality of feed tubes and scoops used in this form of the device.

Figure 7 is a horizontal sectional view on the line 7—7 of Figure 6.

Figure 8 is a view similar to Figure 7 showing an oscillatable as distinguished from a rotary type of drive for the feed scoops.

Figures 9, 10 and 11 are views similar to Figure 5 showing modified forms of the feed scoop.

Figure 12 is a vertical sectional view through a solenoid driven oscillating means for the feed scoops, an electro-diagrammatic view being included to show the operating circuit therefor.

Figure 13 is a horizontal sectional view on the line 13—13 of Figure 12.

Figure 14 is a vertical sectional view similar to Figure 1 showing the use of the solenoid drive of Figure 12.

Figure 15 is a plan view of Figure 14.

Figure 16 is a side elevation of another modified form using an air cylinder as a driving means for oscillating the feed scoop.

Figure 17 is a detail sectional view on the line 17—17 of Figure 16.

Figure 18 is a vertical sectional view on the line 18—18 of Figure 16.

Figure 19 is a side elevation partly in section showing still another modified form of feed tube, particularly designed for spherical capsules and the like.

Figure 20 is a side elevation of Figure 19 taken at right angles thereto.

Figure 21 is a detail sectional view on the line 21—21 of Figure 19; and

Figure 22 is a plan view showing feed tubes arranged in rows instead of in a circle as in some of the previous figures.

On the first five figures of the accompanying drawings, I have used the reference numeral 20 to indicate a feed tube. Its upper end terminates in a combined agitator and feed scoop shown generally at 26, the construction of which will be hereinafter referred to in detail. The feed tube 20 is preferably removably mounted with respect to a driving element such as a pulley 28. As illustrated particularly in Figures 1 and 5, the lower end of the tube is threaded for this purpose. The primary function of the element 26 is to act as a feed scoop projecting into a hopper throat 24.

The throat 24 is preferably removably mounted in a sloping-wall hopper 22 for articles such as capsules C. A pin 25 locates it and keeps it from rotating. The hopper throat 24 may advantageously be frusto-conical in shape and preferably has a bore for the feed tube 20 which is eccentric in relation to the throat as shown in Figure 1, although it may be concentric as in other figures of the drawings. The removability of the elements 20 and 24 permits interchanging them with others of different size for accommodating batches of capsules or other articles to be fed which are of different diameters.

The hopper 22 is suitably supported as on a post 21 which in turn is supported on a frame element 23 which may be part of an encircling machine or the like as shown in my parent application.

The pulley 28 is journalled in upper and lower bearings 30 and 32 which are supported in a bearing cage 31 connected to the hopper 22 and therefore supported by the post 21. A receiving tube 34 is removably mounted on the lower end of the cage 31 so that it can be removed for replacing the feed tube 20 with one of a different size.

A selector block 36 is connected with the receiving tube 34 and has a bore 37 forming a continuation thereof. One-half of part of the selector block is cut away and is normally closed by a selector door 38. This door has a bore 40 complementary to the bore 37. These bores, it will be noted, are tapered to thereby form a restriction in the line of flow of the capsules so that any that are slightly over-size or of undesirable curvature usually termed "banana" capsules, will be caught therein and can be removed as unsuitable for subsequent operations such as encircling or the like. The selector door 38 is transparent, being formed of plastic or the like so that any capsule that is caught may be seen by the operator of the encircling machine and ejected.

With further reference to the construction of the selector, a slidable latch bolt 42 is provided having a latch pin 43 normally engaged as shown in Figure 3 with a latch pin notch 44 of the selector door 38. A latch knob 45 on the latch bolt 42 may be depressed as in Figure 4 for releasing the selector door 38.

Upper and lower capsule holding and blocking pins 48 and an ejector pin 47 are slidably mounted in the selector block 36 and extend from a plate 49, from which plate a stud 50 also extends as shown in Figure 3. The stud has a head on it between which and the selector block a spring 51 is located. The arrangement just described causes the stud to flip the door 38 open to the position shown in Figure 4 (also see the left selector of Figure 1) when the latch knob 45 is depressed so that the undesirable capsule indicated at C" in Figure 1 will be ejected by the pin 47 as illustrated. Thereupon the operator may swing the door closed again and the latch pin 43 will automatically assume its normal position as shown in Figure 3 (also see the right selector in Figure 1) under the action of the spring 46 when the door is completely closed and the pins 47 and 48 will no longer obstruct the passageway through the selector.

The selector block 36, at its lower end, receives the upper end of a flexible conduit 41 through which the capsules C are supplied to the encircling mechanism or other apparatus to be fed from the hopper 22. This conduit is preferably in the form of a spring having the coils sufficiently open to permit inspection of the capsules as they flow therethrough as disclosed in my parent application.

In Figure 2 I show a clamp 52 for holding a platform 53 mounted in position on the post 21. This platform is adapted to support a motor 54 which is provided with a gear reducer 55. The slow speed shaft of the gear reducer is shown at 58 and a pulley 56 is mounted thereon. This pulley is of the double groove type and is operatively connected with the pulleys 28 by a pair of belts 57. Thus the one motor may drive two feed tubes and their scoops 26.

Referring to Figures 6, 7 and 8, a modified construction is shown in which many of the parts correspond to those already described and accordingly bear the same reference character with the addition of the distinguishing characteristic a. The essential differences lie in a multiple unit, circular arrangement and the drive means for the feed tubes 20a and the combined agitators and feed scoops 26a. As illustrated in these three figures, the drive consists of a central gear 60 meshing with pinions 61 on the feed tubes 20a, the relative arrangement being such that a great number of feed tubes surrounding the axis of rotation of the gear 60 may be accommodated as shown in Figure 7.

The drive for the gear 60, as shown in Figures 6 and 7 consists of a sprocket 62, a chain 63 and a sprocket 64, the latter sprocket being mounted on the slow speed shaft 58a of the gear reducer 55a. The feed tubes 20a and their combined agitators and feed scoops 26a are thereby rotated continuously in one direction.

In Figure 8 a mechanism is disclosed for rotating the feed tubes and feed scoops alternately in opposite directions (or oscillating them) and consists of an arm 65 mounted on the shaft 68 for the gear 60 and connected by a link 67 to the crank of a crank disc 66 mounted on the speed reducer shaft 58a.

With reference to the specific details of the combined agitator and feed scoop 26, I illustrate in Figure 5 a mutilated tube 20 which has a trailing edge 69 extending substantially parallel to the axis of rotation of the tube and a somewhat similar leading edge 70 but rounded as at 71 and 72 although the rounding is not absolutely essential. It does seem to contribute to the ease of entrance of the capsules C into the tube, however, when the tube is designed for rotation.

Also in Figure 5, I illustrate a removable projection 73 which may be used optionally, the projection being on the back side of the mutilated part of the tube 20 to aid in agitating the capsules and facilitating their movement toward the intake of the scoop 26 and held in position by a screw 74.

The vertical length of the edges 69 and 70 is advantageously greater than the length of the capsules to facilitate their proper entrance into, and alignment with, the bore of the feed tube 20. The frusto-conical shape of the hopper throat 24 also contributes in this respect as well as its eccentricity when so mounted as in Figure 1.

In Figure 9 I illustrate similar edges 75 on the mutilated portion of the tube 20 which arrangement also works satisfactorily and gives symmetrical shape for both sides so that the feed scoop operates equally well in both directions as when the tube is oscillated rather than rotated. The upper and lower ends of the edges 75, of course, may be rounded similar to the edge 70 in Figure 5 if desired.

In Figure 10 I show another modified arrangement in which one vertical edge 76 is provided and opposing it is a second edge 77 helically arranged. This arrangement offers some improvement in the feed scoop action on certain articles and this applies whether the feed tube is rotated or oscillated. If rotated, the direction of rotation is preferably as indicated by the arrow in this figure; whereas when the tube is oscillated, the edge 76 acts more as an agitator and the edge 77 more as a feeding and aligning means due to its spiral shape.

In Figure 11 I illustrate another arrangement having a vertical edge 78 and a double spiral edge 79—80, the portion 79 is at a greater angle to the axis of rotation or oscillation of the tube 20 than the edge 80. I have found that all the disclosed shapes are operable and that some are more effective for certain shapes and proportions of capsules than others. In all instances, however, the underlying consideration is the mutilation of the upper end of the feed tube 20 as indicated at 26 to form a combined agitator and feed scoop wherein the portion cut away leaves a portion which is on one side of the center of rotation or oscillation and therefore operable to both agitate the capsules and scoop them up and align them with the bore of the feed tube for proper feeding to the receiving tube 34.

In Figures 12, 13, 14 and 15, I show a modification which is solenoid driven. The parts corresponding to those previously described are distinguished by the addition of *b*. The new parts involved are a pair of oscillatable shafts 82 and 83 connected together by a coupler 84 and the mechanism for oscillating these shafts consisting of the following. A solenoid plunger 85 is provided on the shaft 82 and this shaft is also provided with an end plate 86. Similarly a solenoid plunger 87 is provided on the shaft 83 and this shaft has an end plate 88. The plungers 85 and 87 are located in solenoid coils 89 and 90 respectively which are wound on cores 93 with the parts supported in a coil housing 96. The housing 96 in turn may be supported on a bearing cage 31*b* for which a supporting arm 97 is illustrated mounted on a stationary post 98.

The cores 93 and the end plates 86 and 88 form paths for the magnetic flux to the plungers 85 and 87 produced by energization of the solenoid coils 89 and 90 for driving the assembly of cores and shafts 82 and 83 upwardly as shown in Figure 12 when the coil 90 is energized and downwardly when the coil 89 is energized. For alternately energizing the coils, a snap acting switch 94 may be provided and may be actuated by switch actuating arms 95 on the coupler 84 as shown diagrammatically at the right side of Figure 12.

The vertically movable cores 85 and 87 have rotation imparted to them by an arrangement of inclined arcuate tracks 91 of the end plates 86 and 88 coacting with balls 92 that rotate in circular paths on the outer ends of the cores 93. Thus upon energization of the coil 90, the core 87 will be driven upwardly and will rotate in the direction of the arrow *a* due to the incline of the lower tracks 91, the final position of the balls being as illustrated. This positions the upper balls 92 at the shallow ends of the tracks 91 of the end plate 86 as also shown so that the switch 94, having been moved to the position illustrated, now energizes the coil 89 for attracting the plunger 85 and imparting rotation in the opposite direction to the shaft 82. This shaft thereby has oscillating motion and also a slight movement up and down which is taken care of by a pin and slot drive with the shaft 68*b* and the arrangement thereby imparts oscillations through the gears 60*b* and pinions 61*b* to the plurality of feed tubes 20*b*.

In Figures 16, 17 and 18 I show a pneumatic means for oscillating a feed tube 20*c*. Other parts corresponding to previous figures also have the addition of *c* to the reference numerals used. At 100 I show a supporting bar for the mechanism. A rack 102 is provided for imparting oscillations to a pinion 101 on the feed tube. A guide 103 is provided for the rack. The rack is connected with a piston rod 104 having a piston 105 thereon reciprocable in a pneumatic or hydraulic cylinder 106. A valve 107 is provided for alternately admitting air or oil to opposite ends of the cylinder 106 in a well known manner and the valve is operated by an actuating rod 108. The rod has collars 109 thereon against which springs 110 are located, and a valve actuating arm 112 is connected with a piston driven rod 122 to engage the springs 110 at opposite ends of the stroke of the piston 105, thereby reversing the valve 107 to cause automatic reciprocations of the piston in the cylinder. A connector 124 (see Figure 17) connects the rod 122 to the piston rod 104 for simultaneous reciprocation therewith.

In Figures 19, 20 and 21, I show an article feeding hopper particularly adapted for spherical objects such as the capsules indicated at C′. The feed tube in this instance differs from those previously described and has been given the reference numeral 114. Parts in these three figures corresponding to previous figures are given the same reference numerals with the addition of *d*. The feed tubes 114 are plugged at their upper ends as indicated at 115 and have side holes 116 to receive the capsules.

The drive pulleys for the feed tubes are designated 118 and their upper surfaces at 119 constitute the bottoms for the hopper throats 24. This upper surface 119 is perforated at one point by an angular hole 120 leading to the side hole 116 of the feed tube 114. The spherical capsules C′ are rolled around by contact with the outside of the tube 114 and with the upper surface 119 of the pulley 118, and upon one of the capsules coinciding with the angular hole 20, it drops by gravity into it and passes through the side hole 116 into the bore of the feed tube 114.

With spherical capsules, the selector 36 described in connection with Figures 1, 3 and 4 is not needed although all the capsules C′ must be of smaller diameter than the holes 116 and 120 and the bore of the feed tube 114. The feed tubes 114 are accordingly illustrated as feeding directly into the flexible conduits 41*d*. The selectors have likewise been omitted from Figures 6, 14 and 18.

From the foregoing specification, it will be obvious that I have provided article feeding hoppers having means to agitate and scoop the articles into feed tubes for automatic and proper feeding thereof to any desired machine for performing further operations on the capsules. The combined agitator and feed scoop arrangement insures a proper and adequate feed at all times, and where the selector is used in connection with elongated capsules, those of undesirable shape may be caught and eliminated instead of passing on to the banding machine or other device that performs the further operations on the capsules.

A variety of drives has been disclosed for rotating the feed tubes and the agitator and feed scoops either continuously or first in one direction and then in the other to produce the desired agitation of the capsules to prevent them from packing in the hopper, and to cause both their proper feeding into the feed tubes and their proper alignment in the case of elongated capsules for passing end-on into the feed tubes.

In my claims, reference to imparting rotation to the feed scoop can of course be either continuous in one direction or alternately in opposite directions as the scoop will operate to perform both its feed scoop and agitating functions with either type of rotation.

Some changes may be made in the construction and arrangement of the parts of my article feeding hoppers without departing from the real spirit and purpose of my invention, and it is my intention to cover by my claims any modified forms of structure or use of mechanical equivalents which may be reasonably included within their scope.

I claim as my invention:

1. In an article feeding hopper, a hopper having sloping walls to direct articles to a point of discharge, a feed tube at the point of discharge to receive the articles, said hopper being eccentric relative to said feed tube, a combined agitator and feed scoop projecting from said feed tube into the hopper and mounted for rotation, said agitator and feed scoop comprising a tube having a portion of its upper end cut away at one side thereof to form a partial tubular surface defining a lateral entry into the bore of said tube and providing a pair of elongated edges for contactingly engaging the articles to be directed and axially aligning them within the bore of said feed tube, and means for imparting rotation to said agitator and feed scoop.

2. An article feeding hopper comprising a feed tube, means for directing articles by gravity thereto, a combined agitator and feed scoop projecting from said feed tube into said directing means and mounted for rotation, said agitator and feed scoop comprising a tube having a portion of its upper end cut away at one side thereof to form a partial tubular surface defining a lateral entry into the bore of said tube and providing a pair of elongated edges for contactingly engaging the articles to be directed and axially aligning them within the bore of said feed tube, said partial tubular surface being substantially equal in area to the portion cut away, and means for imparting rotation to said agitator and feed scoop.

3. An article feeding hopper comprising a feed tube, means for directing articles thereto, a combined agitator and feed scoop projecting from said feed tube into said directing means and mounted for rotation, said agitator and feed scoop comprising a tube having a portion of its upper end cut away at one side thereof to define a lateral entry into the bore of said tube and providing an edge for contactingly engaging the articles to be directed and orienting them within the bore of said feed tube, and means for imparting rotation to said agitator and feed scoop.

4. In an article feeding hopper, a hopper having a point of discharge, a feed tube at said point of discharge to receive the articles from said hopper, a combined agitator and feed scoop projecting from said feed tube into said hopper and mounted for rotation, said agitator and feed scoop comprising a tube having a portion of its upper end cut away at one side thereof to form a partial tubular surface defining a lateral entry into the bore of said tube and providing a pair of elongated edges for contactingly engaging the articles to be directed and axially aligning them within the bore of said feed tube, said partial tubular surface being substantially equal in area to the portion cut away, at least one of the edges resulting from the cut-away portion being substantially parallel to the axis of rotation of the tube, and means for imparting rotation to said agitator and feed scoop.

5. In an article feeding hopper, a hopper having a point of discharge, a feed tube at said point to receive the articles from said hopper, a feed scoop projecting into said hopper and mounted for rotation, said feed scoop comprising a tube having a portion of its upper end cut away at one side thereof to form a partial tubular surface defining a lateral entry into the bore of said tube and providing a pair of elongated edges for contactingly engaging the articles to be directed and axially aligning them within the bore of said feed tube, said partial tubular surface being substantially equal in area to the portion cut away, at least one of the edges resulting from the cut-away portion being of helical formation, and means for imparting rotation to said feed scoop.

6. A device of the character disclosed comprising a hopper, a removable throat in said hopper having a point of discharge, a feed tube at said point of discharge to receive the articles, means for imparting rotation to said feed tube, said feed tube being removable relative to said means, the upper end of said feed tube having a portion of its upper end cut away at one side thereof to form a partial tubular surface defining a lateral entry into the bore thereof and providing a pair of elongated edges for contactingly engaging the articles to be directed and axially aligning them within the bore of said tube, said partial tubular surface being substantially equal in area to the portion cut away, whereby a feed scoop is formed projecting from said feed tube into said hopper.

7. In an article feeding hopper, a hopper having sloping walls to direct articles to a point of discharge, a feed tube at the point of discharge to receive the articles, feed scoop means projecting from said feed tube into said hopper for receiving articles to be fed to said feed tube, a selector in operative communication with said feed tube to receive the articles therefrom, said selector comprising a body member including a hinged transparent door, said body member and door cooperating to provide a bore therebetween to receive elongated articles, said bore having a reduced portion to catch over-size and/or curved articles to be rejected, spring means biasing said door toward the open position, a catch operatively associated with said door to normally retain it in closed position, stop means for the articles in the selector operatively positioned above the rejected article when said door is open, said stop means being normally in a non-operative position when the door is closed.

8. In an article feeding mechanism of the character disclosed, a hopper having a point of discharge, a selector in operative communication with said hopper discharge to receive articles therefrom, a feed tube operatively connecting said hopper discharge to said selector to provide means for delivery of articles therefrom, said selector comprising a body member including a hinged transparent door, said body member and door having a bore to receive elongated articles, said bore having a reduced portion to catch curved articles to be rejected, spring means biasing said door toward the open position, and a catch operatively associated with said door to normally retain said door in closed position.

9. In an article feeding mechanism of the character disclosed, a hopper having a point of discharge, a selector in operative communication with said hopper discharge to receive articles therefrom, a feed tube operatively connecting said hopper discharge to said selector to provide means for delivery of articles therefrom, said selector comprising a body member including an openable transparent door, said body member and door having a bore to receive elongated articles, said bore being tapered to catch over-size and/or curved articles to be rejected, spring means biasing said door toward the open position, a catch operatively associated with said door to normally retain it in closed position, and stop and blocking means operatively associated with said selector for engaging the articles in the selector above and below the rejected article respectively when said door is open, said stop and blocking means being normally in a non-operative position and movable by said biasing means to operative position when the door is opened.

10. In an article feeding mechanism of the character disclosed, a hopper having a point of discharge, a selector in operative communication with said hopper discharge to receive articles therefrom, a feed tube operatively connecting said hopper discharge to said selector to provide means for delivery of articles therefrom, said selector comprising a body member including an openable transparent door, said body member and door having a bore to receive elongated articles, said bore being tapered to catch over-size and/or curved articles to be rejected, spring means biasing said door toward the open position, and a catch operatively associated with said door to normally retain it in closed position.

References Cited in the file of this patent

UNITED STATES PATENTS

| | | |
|---|---|---|
| 555,896 | Crane | Mar. 3, 1896 |
| 1,031,589 | Russell | July 2, 1912 |
| 1,173,308 | Rockwell | Feb. 29, 1916 |
| 1,389,790 | Swangren | Sept. 6, 1921 |
| 1,645,418 | Cramer | Oct. 11, 1927 |
| 2,062,854 | Yager et al. | Oct. 5, 1931 |
| 2,468,023 | Blue | Apr. 26, 1949 |